Figure 1:
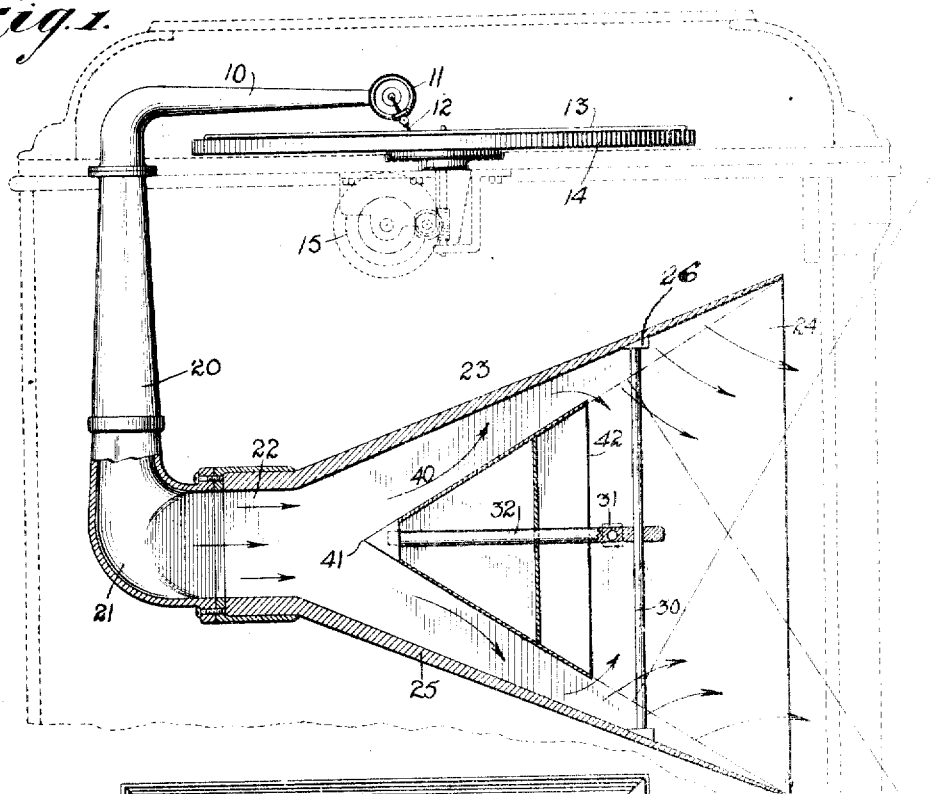

L. M. HART.
AMPLIFYING SYSTEM FOR A COMPLEX SOUND VIBRATION SOURCE.
APPLICATION FILED JUNE 10, 1919.

1,398,965.

Patented Dec. 6, 1921.

UNITED STATES PATENT OFFICE.

LORREN M. HART, OF NEW YORK, N. Y.

AMPLIFYING SYSTEM FOR A COMPLEX SOUND-VIBRATION SOURCE.

1,398,965.  Specification of Letters Patent.  Patented Dec. 6, 1921.

Application filed June 10, 1919. Serial No. 303,041.

*To all whom it may concern:*

Be it known that I, LORREN M. HART, a citizen of the United States, and a resident of the city of New York, borough of Manhattan, in the county and State of New York, have invented new and useful Improvements in Amplifying Systems for a Complex Sound-Vibration Source, of which the following is a full, clear, and exact description.

This invention relates to amplification of sonorous vibrations. In simple language, the object of the invention is to make possible the delivery of a complex vibration sound of large volume in such a manner and of such qualities that it can be perceived by an audience as if identical with the perception of an original sonorous vibration.

The invention is applicable particularly to the amplification of the complex vibrations of a phonograph, although it is also applicable to those of a telephone receiver and, in fact, any complex vibration source of a volume too weak for practical purposes without amplification.

In the case of a violin, the primary agitation is a string, but the beauty, timbre and tonic quality of the violin as an instrument is dependent largely upon the overtones and harmonics which respond to the initial vibration of the string and are actually made possible only when an artistic coordination of resonating air spaces and sounding boards have completed this wonderful musical instrument as an entirety. When a phonograph record is made of some original complex vibration source such as a violin, there is a tendency to alter the relativity between the fundamentals of the violin music and the beautifying overtones and harmonics. In any event, it is well-known that the amplified reproduction of such a phonograph record in an instrument depending largely for its amplification upon a flaring air column, the reproduced amplified sound tends to be harsh or blast-like, in fact of such a character that much of the beauty of the original complex vibration source is unrecognizable. I have discovered also that even in such cases in which the phonic line record and its reproduction through a stylus in a sound-box diaphragm is in nearly perfect similitude to the original complex vibration source, nevertheless the amplified sound from the horn has more imperfections such as enumerated above. I have discovered that not only must the amplifying resonator have inherent qualities capable of sound-functioning in quality and kind corresponding to the physical parts producing all of the vibrations of the original complex vibration source, but also that some means must be provided in the commercial amplifier tending to alter or rectify the loss in relativity or what may be described as the volume diminution of the harmonics and overtones relatively to the fundamentals in the complex vibration transmitted in a sound conduit from some such complex vibration source as a phonograph diaphragm.

An object of my invention is to provide this and I propose to accomplish it by preventing the direct passage of the air vibrations from the sound conduit through the amplifying sound chamber and, by deliberately deflecting them against elastic sounding boards designed particularly to be responsive to the harmonics and overtones which require generous amplification, then, as it were, to focus the generously amplified harmonics and overtones together with the amplified vibrations primarily created by air column resonance.

The above will better be understood by reference to the illustrative embodiment of my invention, set forth in the following specification in connection with the accompanying drawings, which form a part hereof and in which like characters designate corresponding parts in the several figures.

Figure 2:
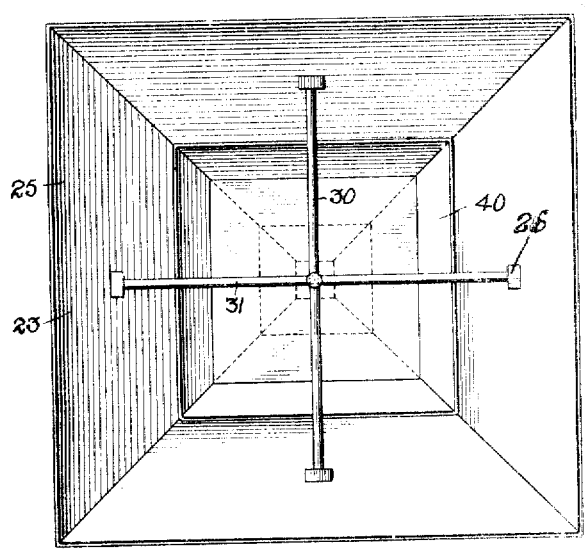

In the drawings:

Figure 1 is a diagrammatic vertical side-elevation with important parts shown in section; and Fig. 2 is a front elevation of the amplifying mechanism.

Any suitable sound conduit is indicated by the parts 10, 20 and 21, although the illustration shows the usual tone arm 10, duct 20 and elbow 21 emerging into the throat 22. Although this sound conduit is illustrated as flaring or gradually enlarging in cross section and therefore as an amplifying conduit, I desire rather to regard it as merely a sound conduit which provides the interior air column indicated by the arrows, functioning as a complex vibration source under agitation, at one end by the diaphragm of the usual sound box 11 operated by the stylus 12 following the phonic line of the usual disk record 13, carried by table 14 and driven, as is customary, by motor 15.

The flaring, resonating sound chamber 23 I prefer to be of pyramidal configuration although for some of the purposes of my invention it may be conical. In its preferred construction it is located within the confines of confining walls 25 or horn-shaped amplifier fabricated from outwardly tapered slabs of well-seasoned wood, although any other sonorously elastic material known to the art of phonograph amplifiers is contemplated. It is preferred that each of the walls 25 be identical one with the other and that they be joined securely one to the other along their edges to complete a right pyramid of polygonal cross section, although four sides are shown in the embodiment illustrated, giving the configuration of a right square pyramid.

Centrally positioned relatively to each wall 25 and located toward the outer rim of each wall is a wedging boss 26 which serves as the end mounting each for the end of a sound post 30 or 31 which, as illustrated, is of relatively little mass but, by its thrust against the boss 26, places the corresponding wall 25 under considerable tension to increase its sounding board functioning. An axially extending rod 32 forms an axial or central mounting for the sound deflector 40 and is centrally mounted upon the posts 30 and 31 and is fixed thereto in such a way that all posts coöperate to coördinate all the sides of the pyramidal sounding boards 25 in their sound functioning. This axial mounting and the outwardly exending posts form a spider or spider-like structure which serves the combined purpose of placing the walls of the amplifier under stress and of mounting the sound-deflector.

With its apex 41 centrally positioned relatively to the throat 22 is mounted a sound absorber and deflector 40, the sides of which correspond in number and symmetry with respect to their edges to the sides of the pyramidal sounding boards 25. This sound deflector 40 is closed toward its outer end but has a mouth flanged 42 at its base end corresponding somewhat to the mouth 24 of the sound board structure 25. The side walls of the deflector 40 are non-parallel with the walls 25 and, on the contrary, are arranged preferably at an acute angle relatively thereto. This deflector 40 functions to deflect practically all the vibratory stream from the sound conduit 21, as indicated by the arrows, directly against the specially formed sounding boards 25 but, at the same time, to permit this vibratory stream to merge, as indicated by the arrows, toward a focal point central of the pyramidal sounding board structure, at which point the sonorous vibrations from the resonating sounding boards 25 are also focused so that the entire structure acts, as it were, itself as a source of amplified vibrations, the sound from which is divergent more or less as indicated by the dash lines in Fig. 1 rather than in the form of a concentrated blast axially of the pyramidal structure 25.

It should be noted that the sound deflector 40 forms choking passages between each of its sides and the corresponding side 25 of the sounding board pyramid which is purposeful and tends to magnify the resonating response of the elastic sounding boards to the overtones and harmonics making up only a part of the complex vibration source in the air column of the sound conduit. To be sure, the entire space within the pyramidal sounding boards functions as a flaring air column resonator in direct connection with the sonorously vibrating air column of the sound conduit, but in a manner much modified over such a flaring column, which presents a direct free passage for the sound waves.

It is my intention and I have found by demonstration that my construction actually gives the sence perception of being an original source of a complex sound vibration, as it were, focused centrally and at the mouth 24. I cannot place too much emphasis upon the combination of my deflector 40, completely closed at the inner end and mounted inwardly clear of the mouth 24 and positioned in such a manner that the stream of sonorous vibration indicated by the arrows in the throat 22 is, as it were, mechanically deflected once as a spreading blast against the symmetrically positioned sounding boards 25, so that the harmonics and overtones are favorable or, as I have described, generously amplified by the resonating sounding boards adjacent to be of a quality particularly responsive to the overtones and harmonics produced by the original source; and this then followed by a central reflection or deflection toward the mid-mouth position of the amplifier both of the foundamental sounds, amplified principally by the flaring air column within the pyramid, and of the vibrations set up by the sounding boards 25 themselves. In fact, the sense perception that my amplifier itself is the source of the music is marked and it is toward this end that the adjustment and combining of the parts should be directed.

What I claim and desire to secure by United States Letters Patent is:—

1. A phonetic amplifying apparatus comprising an air-containing sound conduit with its contained air-column adapted for coöperative conducting contact at one end with a source of a complex sound vibration; an amplifier comprising resonating mediums in the form of tense, flaring sounding boards and inclosing a flaring amplifying air-column in connection with said air column of said sound conduit; and means for deflecting substantially all of the sound waves traversing said air column of said sound conduit directly against said sounding boards without further passage through said flaring air column and permitting the reflection of said waves from said sounding boards to a locality central thereof and yet providing a sound conducting connection between said two air-columns and permitting a combining of the resonating effects of said sounding boards and said flaring air-column.

2. A resonating amplifier comprising several outwardly flaring sounding boards arranged in the configuration of a pyramid secured one to the other along their edges; a closed sound-deadening deflector of pyramidal form arranged coaxially of said sounding board construction, with its apex toward the throat thereof and with its walls forming an acute angle with the walls of said sounding board construction; sound posts placing said sounding boards under tension and cross-connecting the same; and a mounting for said sound-deflector secured to said sound posts in positions symmetrical with respect to said sounding boards.

3. A resonating amplifier comprising a sound-entrance throat; resonating walls flaring outwardly from said throat; a single sound deflector symmetrically mounted with respect to said throat and said walls, with a nose-portion facing said throat and with outwardly flaring sides extending at acute angles with said walls for deflecting the sound blast from said throat substantially in its entirety against a localized band-like area of said walls and itself shorter than said walls so that portions of said walls serve as a local source of amplified sound focusing substantially centrally of the mouth of said walls instead of arriving at said mouth as a direct blast from said throat.

4. A resonating amplifier comprising four or any even number more outwardly flaring sounding boards arranged in the configuration of a pyramid and secured one to the other along their edges; a sound post cross-connecting and placing under stress each pair of opposite sounding boards; an axial mounting secured to said posts at their middle portions; a sound deflector of pyramidal form carried by said axial mounting with its apex toward the small ends of said sounding boards and having outwardly flaring walls forming acute angles with said sounding boards.

5. Apparatus for modifying the sound amplifying qualities of a sound amplifier having outwardly flaring walls comprising a central sound deflector; an axial mounting for said sound deflector; a spider-like formation of sound posts extending out from said mounting; and wedge-shaped bosses between the ends of said posts and the walls of said amplifier.

6. A combined means for mounting a sound deflector and for stressing the walls of a sound amplifier comprising a spider forming a central mounting and having outwardly extending posts and wedge-shaped bosses at the ends of said posts for engaging the flaring walls of said amplifier.

LORREN M. HART.